United States Patent [19]

Adachi et al.

[11] Patent Number: 5,389,867

[45] Date of Patent: Feb. 14, 1995

[54] CONTROL SYSTEM FOR ACTUATOR APPLICABLE TO SERVO SYSTEM HAVING LOW RESOLUTION SENSOR AND SPEED-REDUCTION GEAR MECHANISM

[75] Inventors: Kazutaka Adachi; Yoshinori Yamamura, both of Kanagawa, Japan

[73] Assignee: Nissan Motor Co., Ltd., Yokohama, Japan

[21] Appl. No.: 998,916

[22] Filed: Dec. 30, 1992

[30] Foreign Application Priority Data

Jan. 9, 1992 [JP] Japan .................................. 4-002286

[51] Int. Cl.⁶ .................... H02K 29/02; G05D 23/275
[52] U.S. Cl. ...................... 318/601; 318/632
[58] Field of Search ............. 318/254, 138, 439, 601, 318/608, 609, 638, 128, 560, 561, 569, 632, 565

[56] References Cited

U.S. PATENT DOCUMENTS

| | | | |
|---|---|---|---|
| 3,889,238 | 6/1975 | Sakurai | 318/569 |
| 4,109,190 | 8/1978 | McNaughton | 318/609 |
| 4,139,887 | 2/1979 | Levesque | 318/609 |
| 4,159,444 | 6/1979 | Bartlett et al. | 318/565 |
| 4,494,051 | 1/1985 | Bailey | 318/254 |
| 4,502,752 | 3/1985 | Montagu | 318/128 |
| 4,748,393 | 5/1988 | Fincher et al. | 318/638 |
| 5,132,602 | 7/1992 | Jorgensen et al. | 318/608 |
| 5,206,750 | 4/1993 | Hargarten et al. | 318/561 |

FOREIGN PATENT DOCUMENTS 325078 2/1991 Japan .
9153945 9/1992 Japan .

*Primary Examiner*—William M. Shoop, Jr.
*Assistant Examiner*—John W. Cabeca
*Attorney, Agent, or Firm*—Foley & Lardner

[57] ABSTRACT

In a control system for an actuator applicable to a servo system in which a low resolution sensor and/or an actuator having a play in a speed-reduction gear mechanism, a control gain for the actuator is adjusted according to a result of comparison between an output signal of a control target and output signal of a controlled object. The control gain for the actuator is a cut-off frequency of a low pass filter installed in a disturbance compensator.

4 Claims, 9 Drawing Sheets

CONTROL SYSTEM FOR ACTUATOR APPLICABLE TO SERVO SYSTEM HAVING LOW RESOLUTION SENSOR AND SPEED-REDUCTION GEAR MECHANISM

BACKGROUND OF THE INVENTION

1. Field of The Invention

The present invention relates generally to a control system for an actuator applicable to a servo system in which an actuator is used together with a low resolution sensor or a speed-reduction gear mechanism having a play.

2. Description of The Background Art

A Japanese paper titled "Robust Control for Automotive Actuator" which is announced in a "tenth adaptive control symposium" (held from Jan. 31, 1990 to Feb. 2, 1990 in Tokyo, Japan) exemplifies a previously proposed actuator control system.

In the disclosed actuator control system, a method of controlling the actuator of a DC motor type four rear tire wheel steering actuator includes a model adaptive control to which a robust compensator is added.

Therefore, this method can achieve a rear tire wheel steering angle control system having a technique of preventing an influence of dynamics which cannot be modeled and preventing a deterioration of control achievement due to a disturbance.

However, since in the previously proposed actuator controlling apparatus, a resolution of a rotation angle sensor for the DC motor is coarse or low and a play such as a backlash of a gear of a speed-reduction mechanism is present, and a limit cycle occurs at points in the proximity to a target value, the DC motor generates vibrations and vibration sounds and the current flowing through the DC motor always is consumed in a form of rectangular wave. Consequently, the generation of electrical noise and wasteful power consumption are brought out.

SUMMARY OF THE INVENTION:

It is, therefore, a principal object of the present invention to provide a system for controlling an actuator applicable to a servo system in which the actuator is used in a situation in which a low resolution sensor or a play in a speed-reduction gear mechanism is present, by which a magnitude and/or frequency of a limit cycle (self-excited oscillation) generated at points in the vicinity to a target value can be suppressed to be low and generation of noise and electrical noise can be prevented.

The above-described object can be achieved by providing a control system for an actuator, the actuator being capable of arbitrarily moving an controlled object, comprising: a) first means for calculating a control target that the control system is desired to have; b) second means for detecting an output variable of the controlled object; c) a signal comparator which is so constructed as to compare both output signals related to the control target and related to the output variable of the controlled object; d) third means for receiving the output signals related to the control target and related to the output variable of the controlled object and calculating and generating an input signal to be input to the actuator; and, c) fourth means for adjusting a control gain of the actuator according to a result of comparison by the third means.

DESCRIPTION OF THE PREFERRED EMBODIMENTS

Reference will, hereinafter, be made to the drawings in order to facilitate a better understanding of the present invention.

Figure 1:
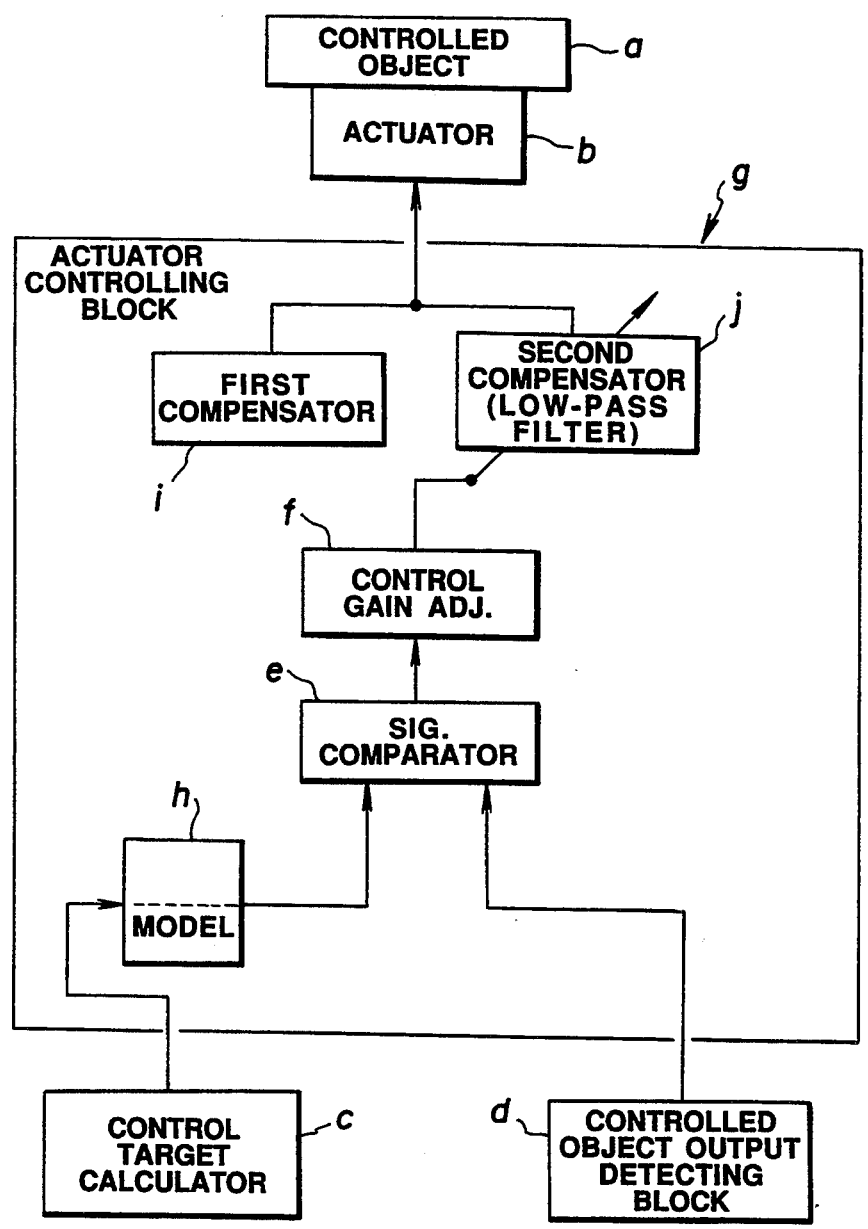
FIG. 1 is a conceptional view of an actuator controlling system according to the present invention.

FIG. 1 functionally shows the concept of an actuator controlling system according to the present invention.

The actuator controlling system according to the present invention includes: an actuator b which is so constructed as to move arbitrarily a controlled object a; a controlled object calculating block c which calculates a control target; controlled object output controlling block d which detects an operating variable (hereafter referred to as output) of the controlled object; a signal comparator e which compares a controlled target output signal and controlled object output signal; and a control gain adjuster f which adjusts a control gain according to a comparison signal, the actuator controlling system having an actuator control block g for calculating an input signal to the actuator b.

It is noted that the actuator control block includes a model h and one of the signals to be compared by means of signal comparator e is a model signal.

In addition, the actuator control block g includes a first compensator i which outputs a model signal to coincide with a response of the model h and a second compensator j to output a compensation signal so as to eliminate the influence of the disturbance.

Figure 2:
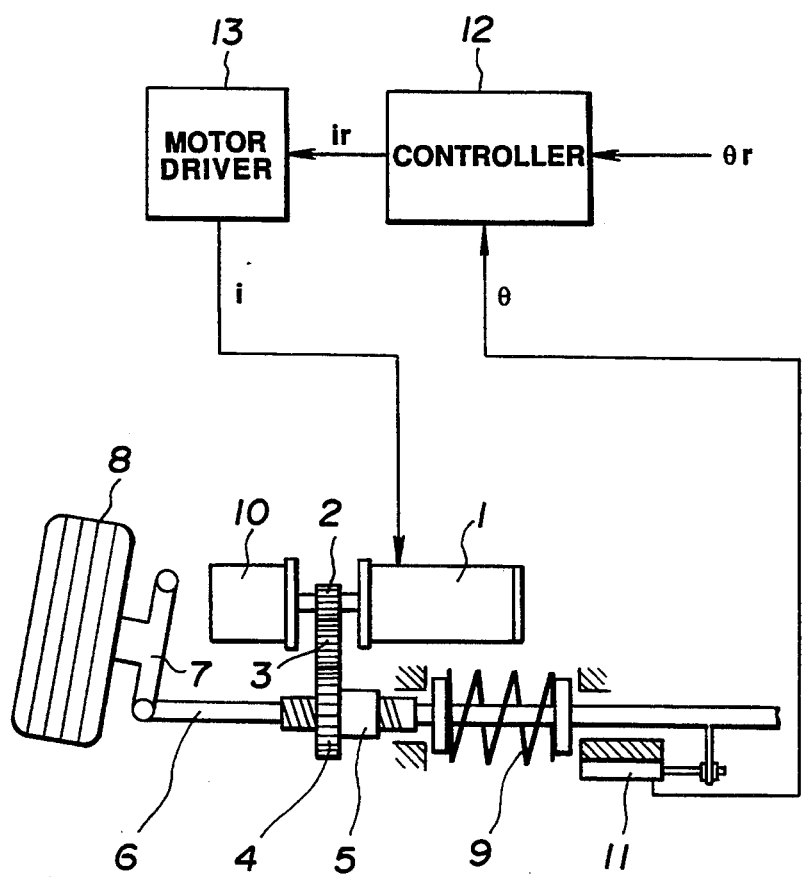
FIG. 2 is a whole system configuration of the actuator controlling system which is applicable to a vehicular rear wheel steering control system in a preferred embodiment according to the present invention.

FIG. 2 shows a whole system configuration of a rear tire wheel steering angle control system to which the actuator controlling system is applicable in a preferred embodiment according to the present invention.

In FIG. 2, numeral 1 denotes a DC motor (equivalent to an actuator), numeral 2 denotes an input gear, numeral 3 denotes an intermediate gear, numeral 4 denotes an output gear, numeral 5 denotes a ball screw, numeral 6 denotes a tie rod, numeral 7 denotes a knuckle arm, numeral 8 denotes a rear tire wheel, numeral 9 denotes a return spring which is biased so as to return the rear tire wheel steering angle toward a neutral position during no control operation, numeral 10 denotes a rotary damper, numeral 11 denotes a stroke sensor which is so constructed as to detect the stroke of the tire rod 6, numeral 12 denotes a controller, and numeral 13 denotes a motor drive circuit. A speed-reduction gear mechanism is constituted by the input gear 2, intermediate gear 3, output gear 4, and ball screw 5.

A rotary motion of the DC motor 1 is converted into a linear motion of the tie rod 6 via the input gear 2, intermediate gear 3, output gear 4, and ball screw 5. The tire rod 6 accordingly pushes and pulls the knuckle arm 7 to be converted into the rotary motion of the tire wheel 8.

The stroke sensor 11 detects an angle of rotation of the DC motor 1 and outputs a voltage value (actual rear tire wheel steering angle $\theta$) corresponding to a stroke quantity of the tie rod 6.

The controller 12 receives a rear tire wheel steering angle command value $\theta_r$ calculated on the basis of a method disclosed in pages 7, 8, and 9 of a Japanese Patent Application First Publication No. Heisei 3-25078 from a steering angle of a vehicular steering wheel system and vehicle speed (also disclosed in a U.S. patent application Ser. No. 07/758,454 now allowed, the disclosure of which is herein incorporated by reference) and receives the actual rear tire wheel steering angle value $\theta$ derived from the stroke sensor 11, calculates a current command value $i_r$ to flow into the DC motor 1 in accordance with a control method as will be described later, and outputs the current command value $i_r$ to the motor drive circuit 13.

The motor drive circuit 13 is operated so that the motor current i follows up the motor current command value $i_r$.

A control technique used in the controller 12 will be explained below:

An equation (1) recited in an attached table 1 represents a motion equation of a rear tire steering wheel mechanism shown in FIG. 2 which is a controlled object of a servo system of positioning a rear tire wheel steering angle.

In the equation (1), $K_T$: motor torque constant; $\ddot{\theta}$: motor rotation acceleration; $\dot{\theta}$: motor rotation speed, J: motor axle converted actuator inertia, D: motor axle converted actuator viscosity coefficient, K: spring constant, and i: motor current.

When the equation (1) is Laplace transformed and the result of Laplace transform is arranged as in an equation (2).

Since the controller 12 is constituted by a digital computer, the equation (2) is discrete to transform the equation (2) using a zero-order holder into an equation (3) of the attached table 1.

In the equation (3), Z: z transform, and $(1-z^{-1})/S$: zero-order holder.

Rewriting the equation (3) to derive an equation (4) of the attached table 1:

In the equation (4), the following equations (5) through (7) recited in the attached table 1are established.

Then, the equation (4) can be substituted by an equation (8) according to the equations (5) through (7).

A desired characteristic in a positioning of the rear tire wheel steering angle can be represented by an equation (9) of the attached table 2.

Figure 3:
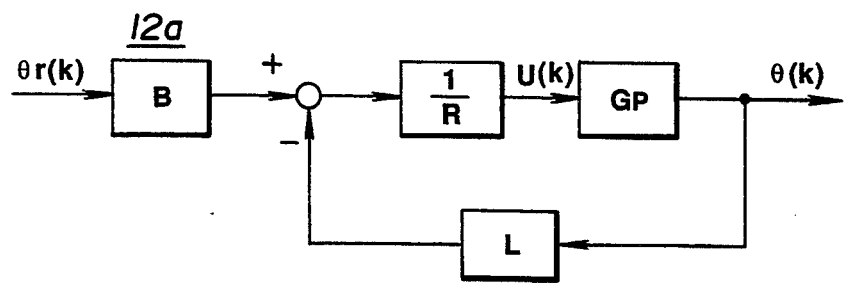
FIG. 3 is a circuit block diagram indicating a control system in a controller in the preferred embodiment shown in FIG. 2 to achieve a desired response by a designer.

FIG. 3 shows a circuit block diagram representing the control system satisfying the equation (9).

A gain can be derive as in equations (10) and (11) of the attached table 2 which makes a transfer characteristic from $\theta_r(k)$ to $\theta(k)$ coincident with the desired characteristic expressed in the equation (9).

Substituting the equation (10) into the equation (11), an equation (12) of the attached table 2 is established as a transfer characteristic from $\theta_r(k)$ to $\theta(k)$.

In order to make the equation (12) coincident with the desired transfer characteristic (9), $B(z^{-1})$, R $(z^{-1})$, and $L(z^{-1})$ may be derived which satisfies equations (13) and (14) of the attached table 3.

Supposing that equations (15) and (16) of the attached table 3 are established, a left side of the equation (14) is expressed in an equation (17) of the attached table 3.

Hence, when both coefficients recited in the right side and left side of the equation (17), equations of (18), (19), and (20) of the attached table 3 are established.

Thereafter, terms of r, $L_0$, and $L_1$ are derived as in equations (21), (22), and (23) which satisfy the equations (18), (19), and (20).

Consequently, when ideal state occurs in which no disturbance and/or parameter variation is found, a desired response characteristic by a designer may be obtained.

Next, a part of the control system which compensates for an influence from the disturbance or parameter variation will be described below.

Figure 4:
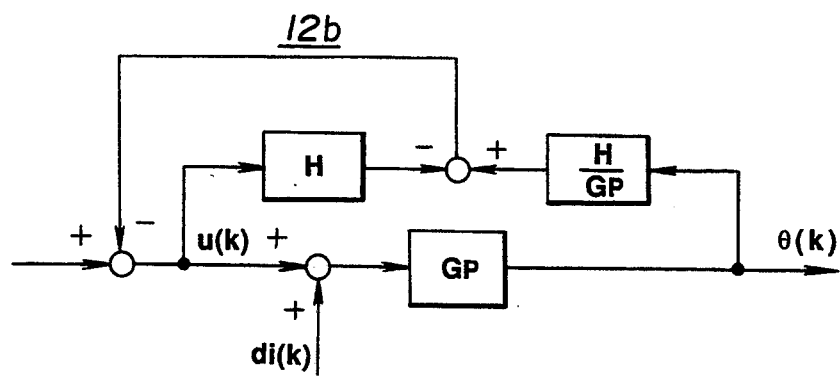
FIG. 4 is a circuit block diagram indicating a control system in the controller in the preferred embodiment shown in FIG. 3 to achieve an elimination of influence of a disturbance.

FIG. 4 shows a compensation part of the control system.

If the input u(k) and disturbance di(k) are added to the controlled object $G_p(z^{-1})$ (refer to FIG. 4), an output $\theta(k)$ is expressed in an equation (24) of the attached table 4. In the equation (24), the disturbance di(k) is set as a constant disturbance. In addition, the term u(k) is expressed in an equation (25) of the attached table 4.

Substituting the equation (24) into the equation (25), an equation (26) of the attached table 4 is established.

If $H(z^{-1})$ is time infinite and is selected so as to converge to 1, an equation (27) of the attached table 4 is established and the influence from the disturbance can be eliminated.

In addition, if the converging characteristic of $H(z^{-1})$ becomes fast, the influence from the disturbance can speedily be suppressed.

Supposing now that $H(z^{-1})$ is a first order lag filter (low pass filter), an equation (28) is established.

In the equation (28), $\alpha = \exp(-\tau \cdot \omega_{NF})$, $\tau$: sampling time, and $\omega_{NF}$: cut-off frequency of the low pass filter.

Figure 5:
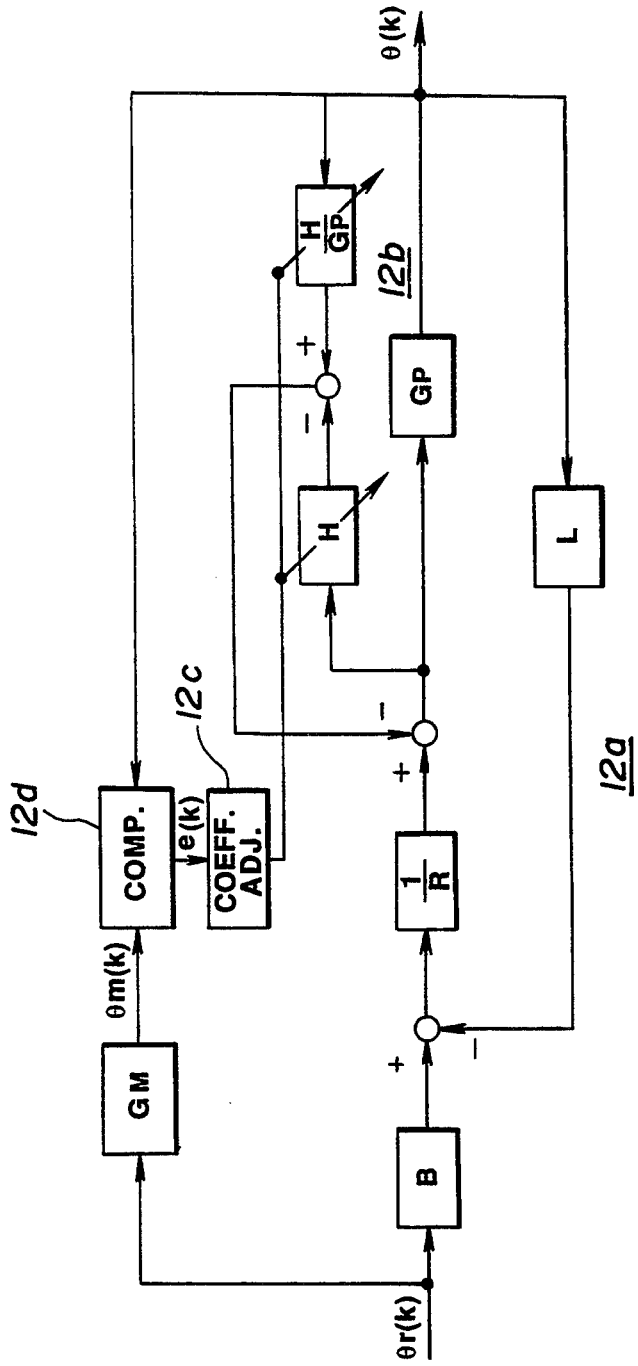
FIG. 5 is a circuit block diagram indicating a whole control system in the controller in the preferred embodiment shown in FIG. 3.

FIG. 5 shows the structure of the controller 12 having a combination of a part 12a (equivalent to the first compensator) to derive the desired response characteristic shown in FIG. 3 with a part 12b (equivalent to a second compensator) to eliminate the disturbance shown in FIG. 4 and a coefficient adjuster 12c (control gain adjuster) which is located in the disturbance eliminating part 12b and which serves to adjust the converging characteristic of $H(z^{-1})$ according to the change in the cut-off frequency of the low pass filter.

In FIG. 5, $G_M$ denotes a typical model and 12d denotes a comparator (equivalent to a signal comparator). In the comparator 12d, a difference e(k) between a typical model response characteristic $\theta_m(k)$ desired by the designer according to the rear tire wheel steering angle command value $\theta_r(k)$ and actual rear tire wheel steering angle value $\theta(k)$ is calculated. In the coefficient adjuster 12c, the converging characteristic of $H(z^{-1})$ in the disturbance eliminating part 12b is changed according to the magnitude of the difference e (k). This change is caused by the change in the cut-off frequency $\omega_{NF}$ of the low pass filter.

In details, the term e(k) is expressed in an equation (29) and the term $\omega_{NF}$ is expressed in an equation (30).

Thereby, the gain or the control system in the vicinity of the target value is reduced so that the limit cycle which would otherwise occur due to a low resolution of a sensor and play or backlash in the speed-reduction gear mechanism can be reduced or is not generated.

Figure 6A:
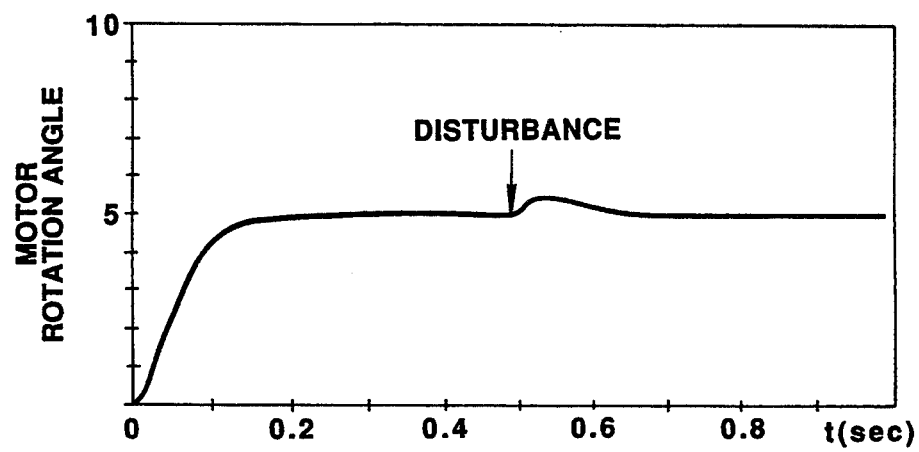
FIGS. 6(A) and 6(B) are characteristic graphs as results of simulations on a motor rotation angle and on a motor current in a method of control by means of a high-gain robust compensator adopted in the previously proposed actuator control system in a case where a disturbance occurs after convergence to a target value, respectively.
Figure 6B:
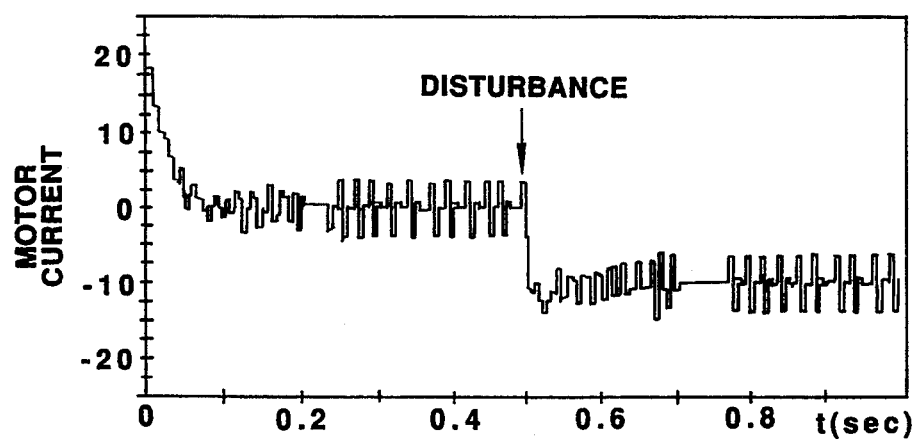

FIG. 6 shows a result of simulation in a conventional method by means of a high gain robust compensator to reduce the influence from the disturbance.

Figure 7A:
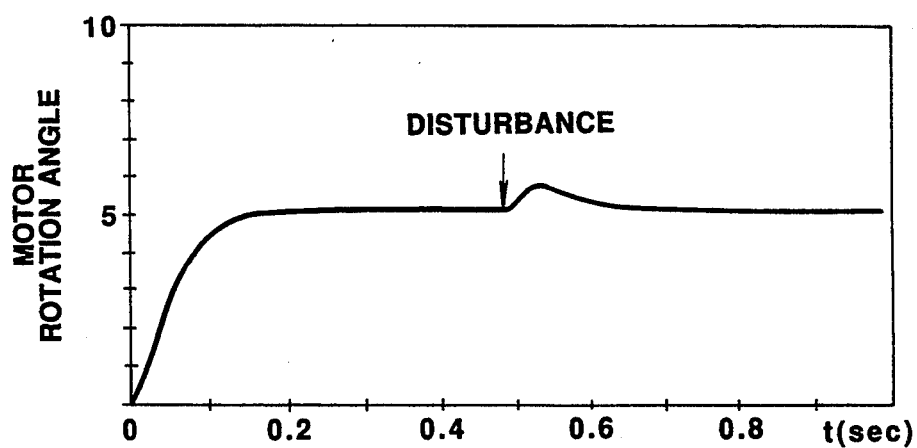
FIGS. 7(A) and 7(B) are characteristic graphs as results of simulations on the motor rotation angle and on the motor current in the method of control by means of a low-gain robust compensator adopted in the actuator control system in a case where a disturbance occurs after convergence to the target value, respectively.
Figure 7B:
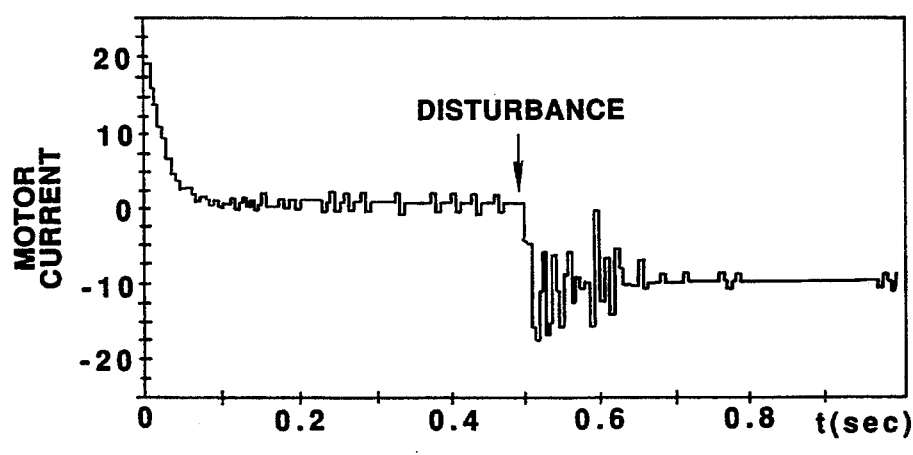

FIG. 7 shows a result of simulation in a method carried out in the preferred embodiment.

This simulation was carried out supposing that, after the convergence to the target value, a disturbance equivalent to an input current of 10 Amperes (A) is applied to the DC motor 1.

As far as the motor current is concerned, the preferred embodiment indicated considerably stable as compared with the conventional method after the convergence into the target value or after the suppression for the influence of the disturbance.

In addition, as far as the motor rotation angle is concerned, the influence of the disturbance remained so unchanged in the case of the preferred embodiment and in the case of the conventional method and the motor rotation angle was 0.6 radian (rad) at maximum and convergence time was about 0.2 (sec).

Figure 8A:
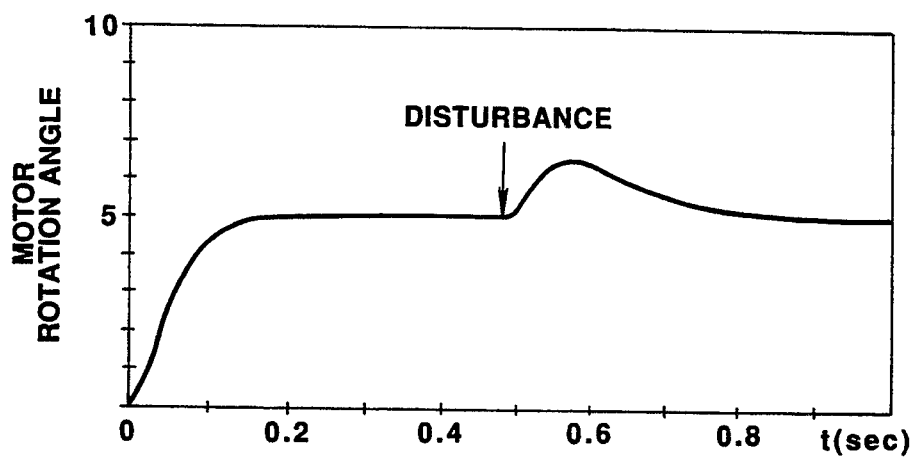
FIGS. 8(A) and 8(B) are characteristic graphs as results of simulations on the motor rotation angle and on the motor current in the method of control by means of the controller in the previously proposed actuator controlling system in a case where the disturbance occurs after convergence to the target value, respectively.
Figure 8B:
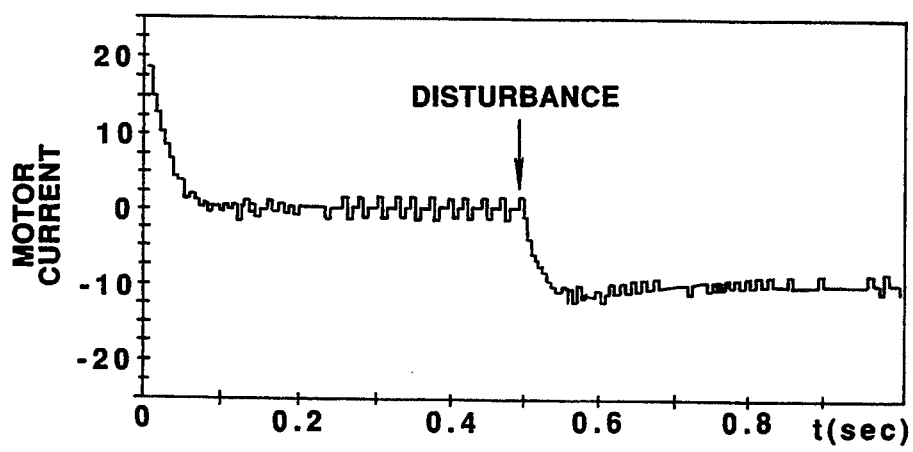

FIG. 8 shows a result of simulation in the conventional method by means of a low gain robust compensator to reduce the limit cycle.

Figure 9A:
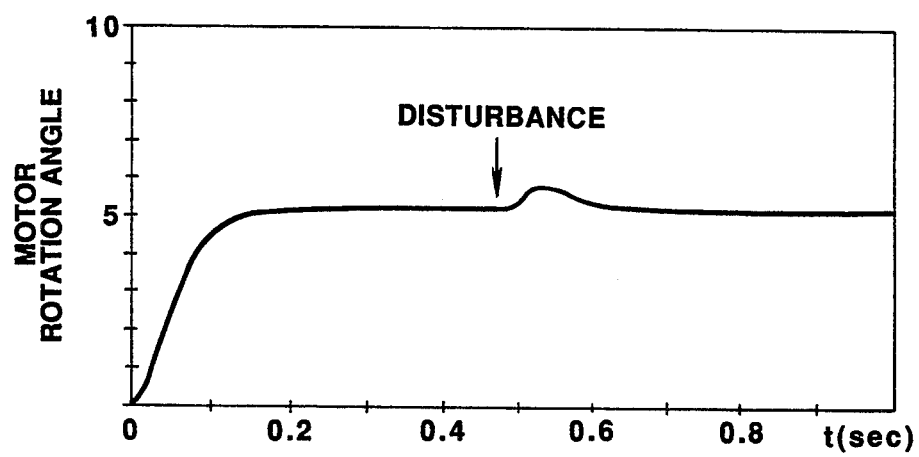
FIGS. 9(A) and 9(B) are characteristic graphs as results of simulations on the motor rotation angle and on the motor current in the method of control by means of the controller in the preferred embodiment of the previously proposed actuator controlling system in a case where the disturbance occurs after the convergence to the target value, respectively.
Figure 9B:
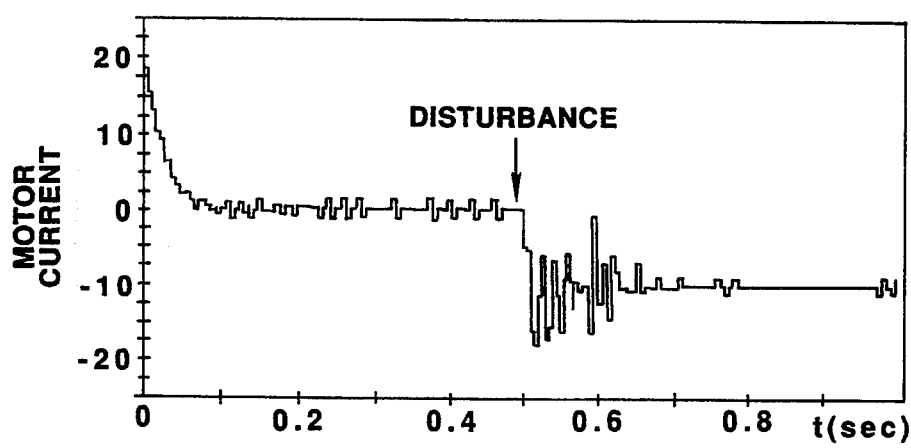

FIG. 9 shows the result of simulation in the method of the preferred embodiment.

This simulation was carried out supposing that the disturbance equivalent to an input current of 10 Amperes was applied to the DC motor.

As far as the motor current is concerned, a magnitude of the current in the form of rectangular waveform at the time after the convergence to the target value did not change in the case of the conventional method and did not change in the case of the preferred embodiment. However, in the case of the method in the preferred embodiment, the position of the motor rotation angle after the application of the disturbance was 0.6 (rad) at maximum and the convergence time was about 0.2 (sec). On the other hand, in the case of the conventional method, the maximum value was 1.6 (rad) and convergence time was 0.4 (sec).

As appreciated from the simulation results, an effectiveness of the preferred embodiment can be recognized.

Figure 10:
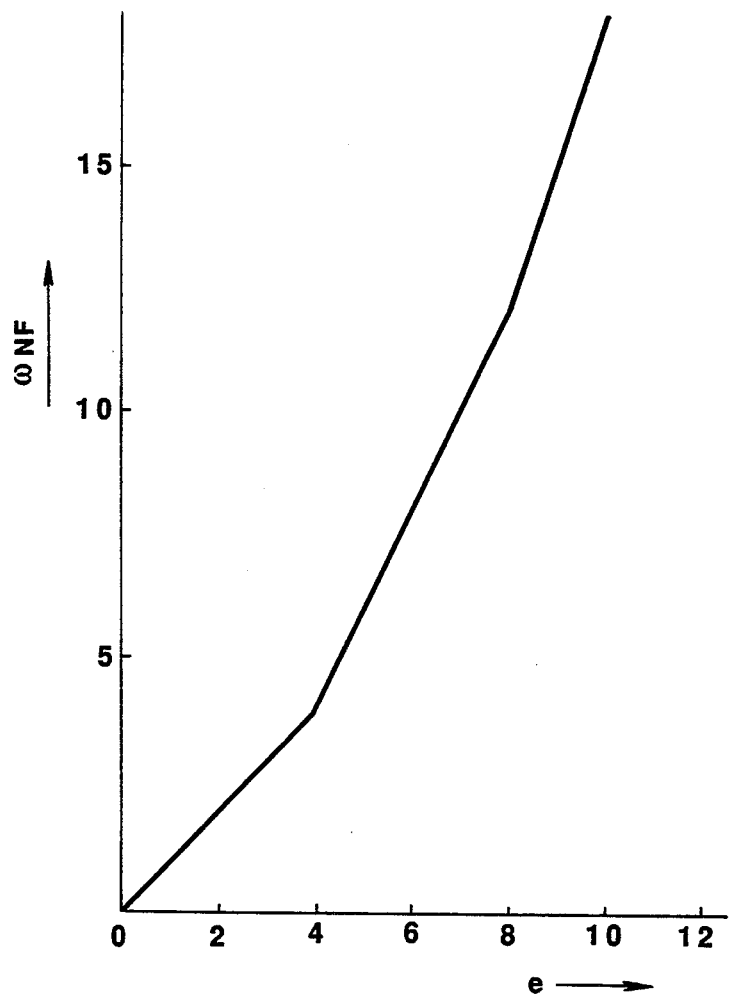
FIG. 10 is a characteristic graph of a map indicating a cut-off frequency of a low-pass filter used in the simulations shown in FIGS. 7(A), 7(B), 9(A) and 9(B).

FIG. 10 shows a map of the cut-off frequency $\omega_{NF}$ of the low-pass filter used in the series of simulations shown in FIGS. 7 and 9.

$J = 0.0001$ [kgfms$^2$/rad]
$D = 0.002$ [kgfms/rad]
$K = 0.001$ [kgfms/rad]
$K_T = 0.0025$ [kgfm/rad]
$\omega_n = 2\pi \times 5$
$\zeta = 0.95$
$\omega_{NF} = 2\pi \times 20$ (a value in the case of the conventional method shown in FIG. 6)
$= 2\pi \times 2$ (a value in the case of the conventional method shown in FIG. 8)

In addition, the stroke sensor 11 attached onto the tie rod 6 for detecting the rear tire wheel steering angle had a resolution of 2degrees when converted onto the motor axle.

As described above, the actuator control system in the preferred embodiment includes: the low resolution stroke sensor 11; speed-reduction gear mechanism having the play; DC motor 1; the compensator part 12a which is so constructed as to try to coincide with the response of the typical model $G_M$; the compensator part 12b which eliminates the influence of the disturbance; and the coefficient adjuster 12c which varies the cut-off frequency $\omega_{NF}$ of the low-pass filter according to the difference e(k) between the typical model response $\theta_m(k)$ and actual rear tire wheel steering angle value $\theta(k)$. Therefore, a magnitude and/or frequency of the limit cycle generated in the vicinity to the target value can largely be suppressed and, consequently, generations of the noisy sound and/or electrical noise can be prevented.

The present invention is not limited to the preferred embodiment described above.

The present invention is also applicable to a servo system such as an electronically controlled throttle device disclosed in, e.g., a Japanese Patent Application First Publication No. Showa 59-153945.

That is to say, the present invention is applicable to every servo system having a low resolution sensor and/or having a play in a speed-reduction gear mechanism and such that the limit cycle occurs in the vicinity to the target value.

As described hereinabove, since the actuator control system according to the present invention applicable to every servo system having the low resolution sensor and/or speed-reduction gear mechanism having the play or backlash, the control gain of the actuator is adjusted on the basis of a comparison between the output signal of the control target which represents the error and the output signal of the controlled object, the magnitude and/or frequency of the limit cycle generated in the vicinity to the target value can largely be suppressed. Consequently, the noisy sound and/or electrical noise can be reduced or eliminated.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A control system for an actuator, the actuator being capable of arbitrarily moving a controlled object, the control system comprising:
   a) first means for calculating a control target that the control system is desired to reach;
   b) second means for detecting an output variable of the controlled object;
   c) a signal comparator which compares both output signals related to the control target and related to the output variable of the controlled object;
   d) third means for receiving output signals related to the control target calculated by the first means and related to the output variable of the controlled object detected by the second means and for calculating and generating an input signal to be input to the actuator, wherein the third means includes a typical model which represents a motion performance target value desired for the controlled object and the output signals to be compared by the signal comparator are an output signal of the typical model calculated according to the typical model and the output signal of the control target and the output signal related to the output variable of the controlled object, wherein said third means further includes a first compensator which outputs a typical signal therefrom so that the output signal related to the output variable of the controlled object coincides with the output of the typical model and a second compensator which outputs a compensation signal which indicates a difference between a low-pass filtered signal derived using a low-pass filter H from the input signal to the actuator and the output signal related to the output variable of the controlled object which is passed through a second filter which is a product of an inverted transfer function of a previously identified actuator and another low-pass filter having the same transfer characteristics as the low-pass filter, and wherein the third means forms a sum of the typical signal derived from the first compensator and the compensation signal and wherein a control gain to be adjusted is a cut-off frequency of the low-pass filter provided in the second compensator; and
   e) fourth means for adjusting the control gain for the actuator according to a result of comparison by the signal comparator wherein the output signal related to the output variable of the controlled object is a rotation angle of a DC motor expressed as $\Theta(k)$, the input signal to the actuator is expressed as $u(k)$, and the low-pass filter has a transfer function $H(z^{-1})$, and wherein the transfer function of the low-pass filter is expressed as follows:

$$H(z^{-1}) = (1-\alpha)z^{-1}/\{1-\alpha z^{-1}\}.$$

wherein $\alpha = \exp(-\tau.\omega_{NF})$, $\tau$ is a sampling time, and $\omega_{NF}$ is a cut-off frequency of the low-pass filter.

2. A control system for an actuator, the actuator being capable of arbitrarily moving a controlled object, as set forth in claim 1, wherein $\omega_{NF} = K_1.e(k)$ and $e(k) = |\theta_m(k) - \theta(k)|$, and wherein $K_1$ denotes a constant and $\theta_m(k)$ denotes a response of the typical model desired by a designer of the control system according to a command value $\theta_r(k)$.

3. A control system for an actuator, the actuator being capable of arbitrarily moving a controlled object, as set forth in claim 2, wherein $\theta(k) = G_p(z^{-1})\{u(k) + di(k)\}$ and $u(k) = H(z^{-1}).u(k) - \{H(z^{-1})/G_p(z^{-1})\}.G_p(Z^{-1})\{u(k) + di(k)\} = -H(z^{-1}).di(k)$ and wherein $u(k) = -di(k)$ if $H(z^{-1})$ is converged to 1 when a time is infinite.

4. A control system for an actuator, the actuator being capable of arbitrarily moving a controlled object, as set forth in claim 3, wherein said control system further includes a tie rod linked to a rear tire wheel, a speed-reduction gear mechanism, a return spring, and a stroke sensor detecting a stroke of the tie rod in terms of a rear tire steering angle $\theta$ and wherein a motion equation is expressed as follows:

$$J\ddot{\theta} + D\dot{\theta} + K\theta = K_T.i,$$

wherein $K_T$ denotes a torque motor constant, $\ddot{\theta}$ denotes a motor rotation acceleration, $\dot{\theta}$ denotes a rotation speed of the DC motor, J denotes a motor axle converted actuator inertia, D denotes a motor axle converted actuator viscosity coefficient, K denotes a spring constant, and i denotes a motor current.

* * * * *